United States Patent [19]

Moore et al.

[11] Patent Number: 5,382,133
[45] Date of Patent: Jan. 17, 1995

[54] HIGH COVERAGE SHAPED DIFFUSER FILM HOLE FOR THIN WALLS

[75] Inventors: Robert P. Moore, Tequesta; Donald L. Deptowicz, Palm Beach Gardens, both of Fla.

[73] Assignee: United Technologies Corporation, Hartford, Conn.

[21] Appl. No.: 137,866

[22] Filed: Oct. 15, 1993

[51] Int. Cl.6 .................................................. F01D 5/18
[52] U.S. Cl. .................................... 415/115; 415/116; 416/97 R
[58] Field of Search .............. 415/115, 116; 416/97 R

[56] References Cited

U.S. PATENT DOCUMENTS

| | | | |
|---|---|---|---|
| 3,515,499 | 6/1970 | Beer et al. | 416/95 |
| 3,527,543 | 9/1970 | Howald | 416/90 |
| 4,197,443 | 4/1980 | Sidenstick | 416/97 R X |
| 4,303,374 | 12/1981 | Braddy | 416/97 R |
| 4,664,597 | 5/1987 | Auxier et al. | 415/115 |
| 4,676,719 | 6/1987 | Auxier et al. | 415/115 |
| 4,684,323 | 8/1987 | Field | 416/97 R |
| 4,705,455 | 11/1987 | Sahm et al. | 415/115 |
| 4,738,588 | 4/1988 | Field | 415/115 |
| 5,223,320 | 6/1993 | Richardson | 416/97 R |

*Primary Examiner*—Edward K. Look
*Assistant Examiner*—Michael S. Lee

[57] ABSTRACT

A film cooling passage through the external wall of a hollow airfoil having in serial flow relation a metering section and a diffusing section, the diffusing section characterized in that it has four inward facing surfaces that define a passage having a generally rectangular cross-section and an outlet over which a hot gas stream flows in a "downstream" direction. One of the surfaces of the diffusing section is generally "downstream" of the other surfaces, and this surface defines a section of a circular cylinder.

12 Claims, 3 Drawing Sheets

HIGH COVERAGE SHAPED DIFFUSER FILM HOLE FOR THIN WALLS

The invention was made under a U.S. Government contract and the Government has rights herein.

TECHNICAL FIELD

This invention relates to film cooling, and more particularly to film cooled walls over which a hot gas stream is flowing, such as in the case of airfoils used in gas turbine engines.

BACKGROUND ART

The turbine blades, or airfoils, of axial flow gas turbine engines are directly exposed to the hot gas stream which exits the combustion section of the gas turbine engine. As combustor temperatures are increased to increase the performance of gas turbine engines, the temperature of the hot gas stream may exceed the critical design temperature limits determined by the airfoil material capability, maximum stress, and life requirement considerations. To prevent this, the external surface of the airfoils may be cooled by discharging cooling air from an internal cavity of the airfoil onto the external surface thereof through a plurality of small passages to create a film of cooling air. This film forms a boundary layer on the external surface of the airfoil downstream of each passage thereby providing a protective film of cool air between the hot gas stream and the external surface of the airfoil. The angle between the axis of the passage and the external surface of the airfoil, and the direction of the flow of the hot gas stream over the airfoil surface at the outlet of each passage are important factors which influence the effectiveness of the film cooling. Since film cooling effectiveness decreases rapidly with increasing distance from a particular cooling passage outlet, maintaining high film cooling effectiveness for as long a distance as possible over as large a surface area as possible is the main goal of airfoil film cooling.

It is well known in the art that the engine airfoils must be cooled using a minimum amount of cooling air, since the cooling air is working fluid which has been extracted from the compressor, and bleeding off working fluid downstream of the compressor reduces overall engine efficiency. Thus, airfoil designers face the problem of providing for cooling of all the engine airfoils using a maximum allowable cooling fluid flow rate. The amount of fluid which flows from the internal cavity of the airfoil into the hot gas stream through each individual cooling passage is controlled by the metering area—the minimum cross-sectional area—of the cooling passage. The metering area is typically located adjacent the intersection of the passage and the internal cavity. The combined metering areas of all of the cooling passages and orifices leading from the internal cavity of a given airfoil limits the total flow rate of coolant from the airfoil for a given pressure differential between the internal cavity and the external surface of the airfoil. The airfoil designer has the job of specifying the passage size and the spacing between passages, as well as the shape and orientation of the passages, such that all areas of the airfoil are maintained below critical design temperature limits. Ideally, designers of airfoils would like to bathe the entire external surface of the airfoil with a film of cooling air. However, cooling air leaving the passage exit usually forms a narrow strip of cooling film immediately downstream of each cooling passage outlet. This strip is typically as wide as the width of the passage outlet, that width being the dimension of the passage outlet that is perpendicular to the flow of the hot gas stream. Since each passage reduces the structural integrity of the airfoil to some extent, limitations must be placed on the number, size, and spacing of cooling passages. These limitations have resulted in gaps in the protective film and/or areas of low film cooling effectiveness that produce hot spots on the airfoils. Airfoil hot spots are one factor which limit the operating temperature of the engine.

What is needed is a means of providing improved film cooling effectiveness without increasing the amount of cooling air required and without significantly reducing the structural integrity of the airfoil.

DISCLOSURE OF THE INVENTION

One object of the present invention is an improved film cooling passage configuration for cooling a wall over which a hot gas stream is flowing.

Another object of the present invention is an airfoil film cooling passage having a relatively short diffusing distance which is able to spread a small amount of coolant, as a film, over a large area of the external surface of an airfoil.

Another object of the present invention is an airfoil film cooling passage which discharges coolant into the hot gas stream at an angle which minimizes penetration of the coolant into the hot gas stream.

According to the present invention, a film cooling passage through a wall to be cooled has a metering section in series flow relation with a diffusing section that leads to the passage outlet at the outer surface of the wall over which a hot gas is to flow, the diffusing section being generally rectangular in cross-section perpendicular to the flow of fluid therethrough and having diverging, spaced apart, oppositely facing side walls interconnecting an upstream surface of the diffusing section to an oppositely facing downstream surface of the diffusion section, the downstream surface diverging from the upstream surface at a rate that increases with increasing distance from the metering section.

The foregoing and other features and advantages of the present invention will become more apparent from the following description and accompanying drawings.

BEST MODE FOR CARRYING OUT THE INVENTION

Figure 1:
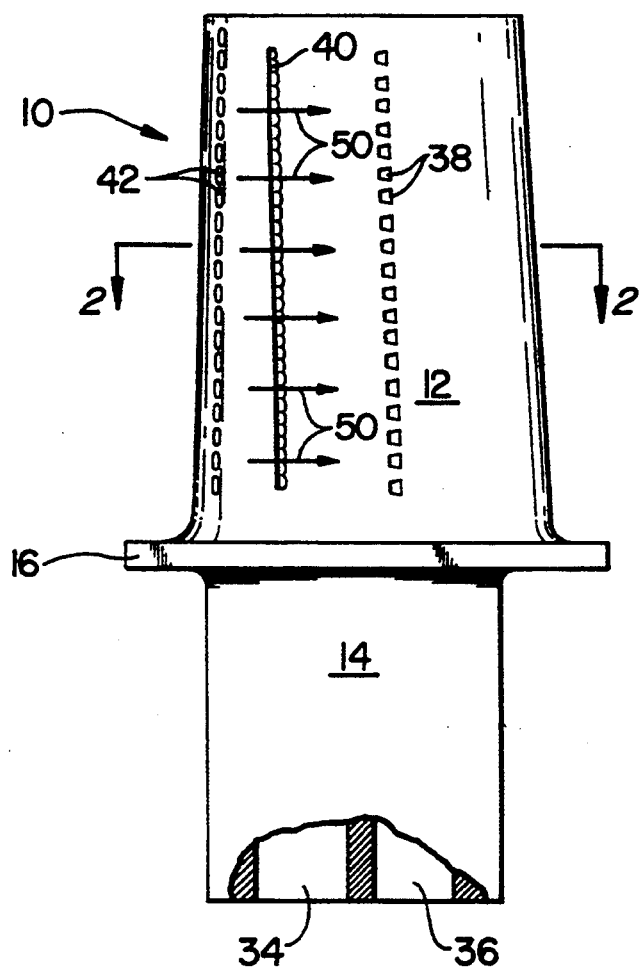
FIG. 1 is a hollow turbine blade, partly broken away, which incorporates the features of the present invention.
Figure 2:
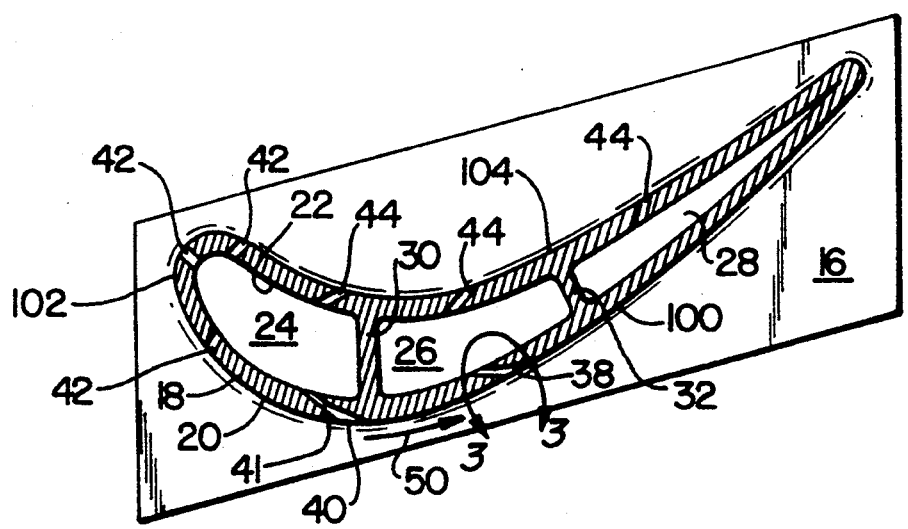
FIG. 2 is a sectional view taken along the line 2—2 of FIG. 1.

Referring to FIGS. 1 and 2, an exemplary embodiment of the present invention is shown incorporated into a turbine blade 10. The blade 10 comprises a hollow airfoil 12 which extends in a spanwise or longitudinal direction from a root 14 which is integral therewith. A platform 16 is disposed at the base of the airfoil 12, and the airfoil 12 comprises a wall 18 having an outer surface 20 and an inner surface 22. The inner surface 22 defines a longitudinally extending internal cavity which is divided into a plurality of adjacent longitudinally extending compartments 24, 26, 28, respectively, by longitudinally extending ribs 30, 32. Passages 34, 36 within the root 14 communicate with the compartment 24, 26, and 28. When the blade 10 is operating in its intended environment, such as in the turbine section of a gas turbine engine, pressurized coolant from a suitable source, such as compressor bleed air, is fed into the passages 34, 36 and pressurizes the compartments 24, 26, 28. The airfoil 12 includes a plurality of longitudinally extending rows of coolant passages, such as the passages 38 on the suction side 100 of the airfoil 12, the passages 42 in the vicinity of the leading edge 102 of the airfoil 12, and the passages 44 on the pressure side 104 of the airfoil 12. Each passage 38, 42, 44 extends from an inlet at the inner surface 22 of the airfoil to an outlet at the outer surface 20. The surface 20 of the suction side also includes a longitudinally extending slot 40, which is fed by a plurality of individual, longitudinally aligned passages 41 which extend to the inner surface 22. The airfoil shown in FIGS. 1 and 2 has been simplified for purposes of clarity, and the number of rows of passages, the number of passages in each row, and the spacing between rows, as shown in the drawing, is intended to be illustrative only and not limiting.

The coolant passages 38, 42, 44 may be formed by any suitable means. A preferred method is by the well known technique of electro-discharge machining (EDM) using an electrode having the shape of the passage to be formed. A plurality of passages may be simultaneously formed using a "comb" electrode of the type which is well known in the art, in which the electrode is comprised of a plurality of adjacent "teeth", each of the teeth having the shape of the passage to be formed and joined together at a common base.

Throughout the drawing the arrows 50 represent the direction of flow (i.e., streamlines) of hot gases over the surface 20 of the airfoil 12. For purposes of the description of the present invention, the direction of flow of hot gases over either the suction side 100 or pressure side 104 surfaces of the airfoil 12 shall be considered to be in the "downstream" direction. Thus, at any point on the suction side surface or pressure side surface 22 of the airfoil 12, the downstream direction is tangent to the surface of the airfoil 12 and, except, perhaps, close to the airfoil tip or the airfoil platform 16 where atypical currents are generated, is substantially perpendicular to the spanwise direction of the airfoil 12.

Figure 3:
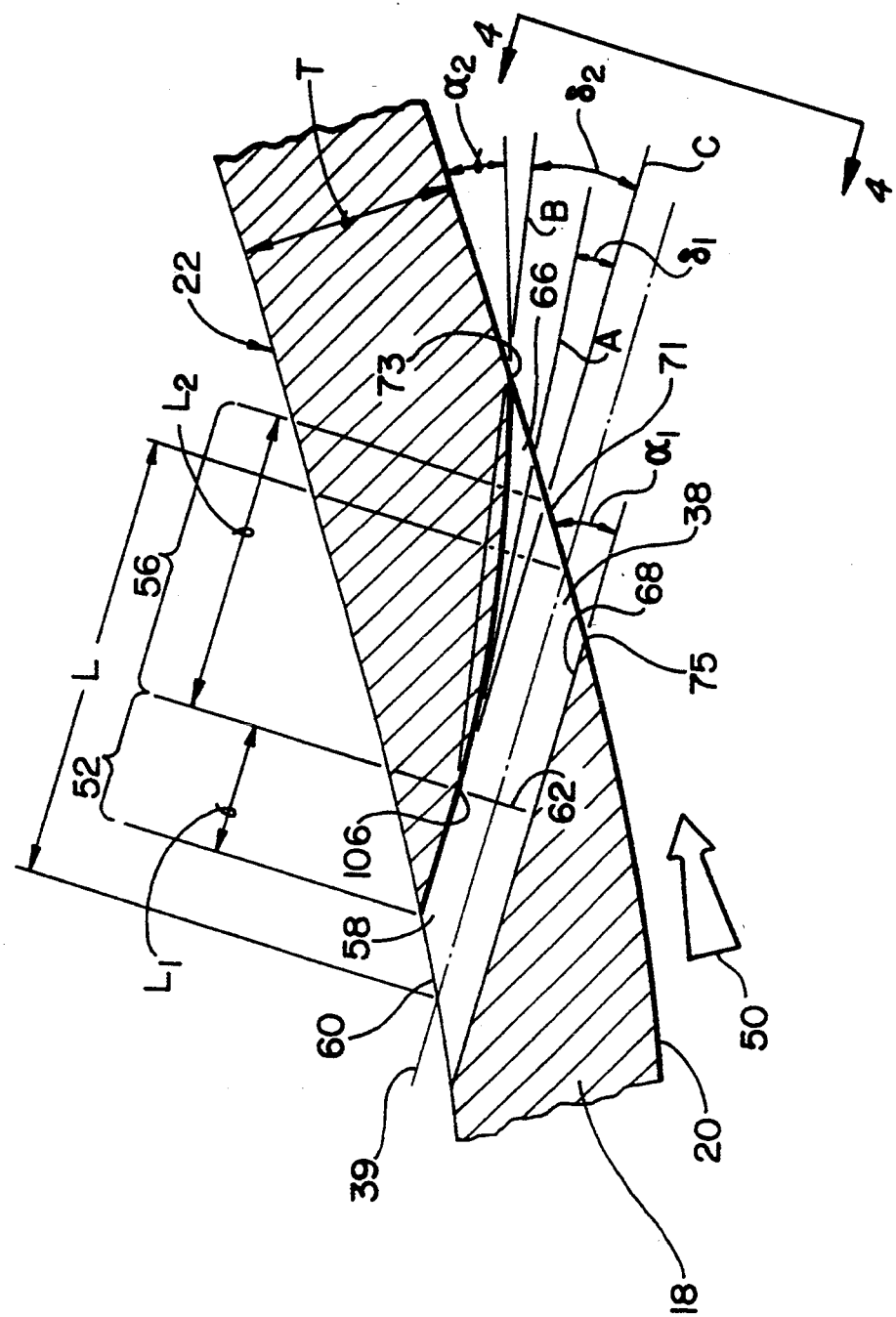
FIG. 3 is an enlarged view of the area 3—3 of FIG. 2 showing a cooling passage configured according to the present invention.
Figure 4:
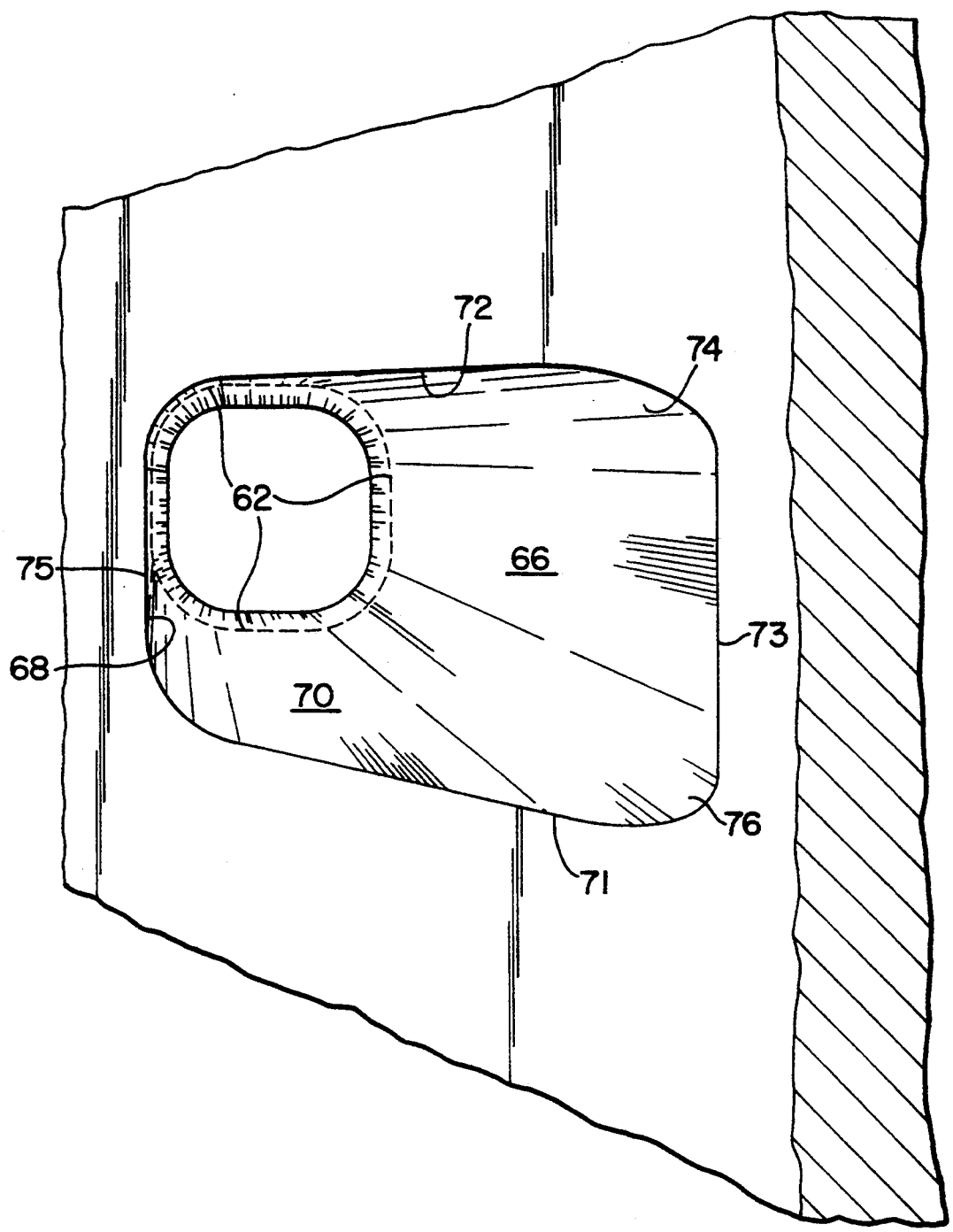
FIG. 4 is a sectional view taken along line 4—4 of FIG. 3.

The improved coolant passages of the present invention are herein shown as the passages 38 disposed in a spanwise row through the suction side 100 wall of the airfoil 12, and shown greatly enlarged in FIGS. 3 and 4. Although described as suction side coolant passages 38, their use is not limited to the suction side 100 of the airfoil 12. It will be evident that the present invention is useful for cooling any relatively thin wall which has a pressurized compartment or chamber containing relatively cool fluid on one side of the wall and a hot fluid flowing over the surface of the other side of the wall in which the area to be cooled is at a lower pressure than the coolant fluid.

Referring to FIG. 3, one of the cooling passages 38 is shown extending through the wall 18 having a thickness T. Although the wall 18 is curved, the curvature is so slight as compared to the size of the passage 38 that for the purposes of the present discussion the wall 18 is considered to be planar. The passage 38 includes in serial flow relation, a metering section 52, followed by a diffusing section 56. In this embodiment, the metering section 52 is generally rectangular in cross-section, however its specific cross-sectional shape is not critical to the present invention and may, for example, be circular or elliptical. By definition, the metering section 52 is that portion of the coolant passage 38 having the smallest cross-sectional area perpendicular to the direction of coolant flow through the passage 38. The coolant flow through the passage 38 is along the longitudinal axis of the passage, also referred to herein as the passage centerline 39, which passes through the geometric center of the cross-sectional area of the metering section 52. The length L of the passage 38 is the length of the centerline 39 between the points where it intersects the surfaces 20, 22. As used herein, the term "axial direction" refers to the direction of coolant flow along the centerline 39 from the inner surface 22 to the outer surface 20. Additionally, the term "downstream surface" as used herein in conjunction with the diffusing section 56 refers to the surface 66 of the diffusing section 56 which faces generally upstream relative to the downstream direction 50 of the flow of the hot gas stream over the passage outlet 71. The downstream surface 66 intersects the outer surface 20 of the wall to be cooled to define what is hereinafter referred to as the downstream edge 73 of the passage outlet 71.

The length $L_1$ of the metering section 52 is preferably short to reduce the cohesiveness of the mass of coolant exiting therefrom. Specifically, a length $L_1$ less than about 3.0 times the effective diameter of the cross-sectional area of the metering section 52 is preferred. The shorter the length of the metering section 52 the better, as long as the metering section area is well defined. The diffusing section 56 has a length $L_2$ which is equal to the difference between the length L of the passage 38 and the length $L_1$ of the metering section 52. Since the wall 18 is considered to be planar and of constant thickness T, those skilled in the art will readily appreciate that $$L_2 = L - L_1 = (T/\sin \alpha_1) - L_1$$

The inlet 58 to the metering section 52 communicates with the inlet 60 to the passage 38 at the inner surface 22 of the wall 18 and receives a flow of coolant fluid therefrom. The outlet 62 of the metering section 52 is coincident with the inlet to the diffusing section 56. The diffusing section 56 includes a pair of spaced apart surfaces 66, 68. The surface 68 is parallel to the spanwise or longitudinal direction of the airfoil. The surface 68 is also parallel to the centerline 39.

As shown in FIG. 4, the diffusing section 56 includes side surfaces 70, 72 which face each other and extend between the surfaces 66, 68. One or both of the side surfaces 70, 72 also extends from the outlet of the metering section 52 to the passage outlet 71 along a path which diverges from the centerline 39. The side surfaces 70, 72 may be planar or convexly curved. Each side surface 70, 72 blends (as at 74, 76) along its length with the downstream surface 66 as a smooth curve as opposed to a sharp corner or fillet. As is known in the art, the smoothly curved corners of the preferred embodiment invention aid in uniformly filling the diffusing section with coolant. In small airfoils with thin walls (e.g., 0.030 inch thick), where the sum of the cross-sectional area of the metering sections of all the coolant passages is restricted, and the minimum size of each metering section is limited by practical considerations, the present invention permits the passage outlets of a spanwise row of passages to be more closely spaced from one another than if prior art passages were used.

Referring again to FIG. 3, the surfaces 66, 68 extend in a generally downstream direction. The upstream surface 68 intersects the outer surface 20 of the airfoil at an angle $\alpha_1$, and the downstream surface 66 intersects the outer surface 20 of the airfoil at an angle $\alpha_2$. Since excessive penetration of the coolant into the hot gas stream can result in the coolant being immediately swept away from the outer surface 20 of the airfoil 12, as opposed to remaining attached thereto as a film of coolant downstream of the passage outlet 71, the angle $\alpha_1$ should be a "shallow" angle of no more than 40 degrees (and preferably 30 degrees or less), in order to minimize penetration of the coolant stream into the hot gas stream in a transverse-flow direction. As used herein, the term "transverse-flow direction" refers to that direction which is perpendicular to the outer surface 20 of the airfoil at the passage outlet 71. The intersection of the surfaces 66, 68 with the outer surface 20 define downstream and upstream edges 73, 75, respectively, of the passage outlet 71, and for this reason the surfaces 66, 68 are referred to as the downstream surface 66 and upstream surface 68, respectively. Note that the downstream surface 66 faces generally upstream, and upstream surface 68 faces generally downstream.

With reference to FIG. 3, line C is parallel to the centerline 39, and line A defines the downstream surface which would result if the downstream surface of the present invention was planar and diverged from the centerline 39 at an angle $\delta_1$. Note that the downstream surface 66 intersects the metering section 52 at a first edge 106, and the downstream surface 66 intersects the outer surface at a second edge 71, and that the first and second edges 106, 71 define the plane B. Thus in FIG. 3 Line B represents the plane that defines the downstream surface which would result if the downstream surface 66 of the present invention were planar and diverged from the centerline 39 at an angle $\delta_2$. Preferably, the magnitude of angle $\delta_1$ is between 5 and about 10 degrees, and the magnitude of angle $\delta_2$ is between 12 and about 20 degrees.

The magnitude of angle $\delta_1$ is determined by two competing design considerations. On one hand, the larger the magnitude of angle $\delta_1$, the larger the flow area of the outlet 71, and thus the lower the velocity at which the coolant is discharged into the hot gas stream 50. As those skilled in the art will readily appreciate, lowering the discharge velocity of the coolant reduces penetration of the coolant into the hot gas stream 50, thereby increasing film cooling effectiveness. It follows therefore, that from a coolant velocity standpoint, it would be desirable to increase the magnitude of the angle at which the downstream surface diverges from the centerline 39 from angle $\delta_1$ to $\delta_2$. However, planar downstream surfaces having angles of divergence from the centerline 39 in excess of 10 degrees have been found to cause flow separation at typical coolant flow conditions, introducing turbulence into the coolant stream within the diffusing section 56. Upon discharge at the outlet 71, this turbulence increases mixing between the coolant and the hot gas stream 50, thereby reducing film cooling effectiveness. Thus, in the prior art the divergence angle $\delta_1$ has been limited to about 10 degrees, and the divergence angle $\delta_2$, which is in excess of angle $\delta_1$, has been unobtainable without introducing unacceptable turbulence.

The present invention overcomes the flow separation problem discussed above by providing a diffusing section 56 having a curved downstream surface 66, as shown in FIG. 3. The downstream surface 66 curves away from the centerline 39 toward the passage outlet 71 and therefore the rate at which the downstream surface 66 diverges from the centerline 39 increases in the axial direction toward the outlet 71. The downstream surface 66 defines a section of a circular cylinder having a radius R, where the radius of curvature R is defined as follows:

$$R = \frac{(T/\sin\alpha_1 - L_1)*(\cos\delta_2 + \sin\delta_2/\tan(\alpha_1 - \delta_2))}{(2*\sin(\delta_2 - \delta_1))}$$

where
 T = the thickness of the wall
 $\alpha_1$ = the angle at which the longitudinal axis intersects the outer surface
 $L_1$ = the length of the metering section
 $\delta_1$ = the angle at which the downstream surface diverges from the centerline at the inlet to the diffusing section
 $\delta_2$ = the angle at which a planar downstream surface would have to diverge from the centerline at the inlet to the diffusing section to produce a desired passage outlet flow area Thus, for a given cooling passage of the prior art having a passage outlet of known area, if it is desired to increase that area by 30%, the designer first determines what angle $\delta_2$ would produce such an area, and then, since all other variables are known, inserts this angle into the above equation to calculate the correct radius of curvature R for the present invention.

The downstream surface 66 immediately adjacent to the outlet 62 of the metering section 52 initially diverges from the centerline 39 by an angle $\delta_1$ of between 5 degrees and 10 degrees, and the line A is tangential to the downstream surface 66 immediately adjacent the outlet 62. The downstream surface 66 intersects the outer surface 20 at an angle $\alpha_2$. Between outer surface 20 and the point at which the downstream surface is tangential to line A, the downstream surface 66 diverges from line A following the radius of curvature described above. Because the downstream surface 66 of the present invention provides a smooth, continuous surface for coolant to diffuse along, the likelihood of flow separation is reduced, and the coolant flow can be turned through an angle sufficiently large to discharge the coolant at an angle $\alpha_2$ without introducing significant turbulence into the coolant flow. The angle $\alpha_2$ that can be satisfactorily obtained using the present invention exceeds the angle $\alpha_2$ that could be satisfactorily obtained using two or three planar surfaces to approximate the curved downstream surface 66 of the present invention, because the intersection of the planar surfaces would cause the "steps" that promote flow separation along planar flow surfaces.

As those skilled in the art will readily appreciate, since the downstream surface 66 curves away from the centerline 39 along a curvature of constant radius, the angle $\alpha_2$ at which coolant flow is discharged onto the outer surface 20 is substantially less than the angle $\alpha_1$. More specifically:

$$\alpha_2 = \alpha_1 + \delta_1 - 2*\delta_2$$

Since the present invention increases the distance between the downstream edge 73 and the upstream edge 75 as compared to a cooling hole of the prior art while the distance between the sidewalls 70, 72 remains essentially the same as compared to the prior art, the cooling holes of the present invention diffuse the coolant over a larger discharge area than the cooling holes of the prior art. This larger discharge area at the passage outlet 71 results in an overall lower discharge velocity for the cooling hole of the present invention as compared to those of the prior art. Additionally, the cooling hole of the present invention discharges the coolant into the hot gas stream an angle $\alpha_2$ that is significantly less than the angle at which the prior art cooling holes discharge coolant into the hot gas stream.

As those skilled in the art will readily appreciate, the cooling hole of the present invention discharges coolant such that the velocity component of the coolant in the transverse-flow direction is substantially less than the transverse-flow direction velocity component of coolant discharged from prior art cooling holes, for a given pressure ratio across the metering section. This results from the lower angle of incidence at which the downstream surface 66 intersects the outer surface as compared to the prior art and from the fact that the flow area of the passage outlet 71 of the present invention is larger than that of comparable cooling holes of the prior art. Since the curved downstream surface 66 of the present invention discharges coolant into the hot gas stream at a smaller angle $\alpha_2$ than the cooling holes of the prior art, penetration of the coolant stream into the hot gas stream is reduced, increasing film cooling effectiveness without increasing the amount of cooling air required. Additionally, due to the minimal difference in the amount of blade material that must be removed in order to produce the cooling holes of the present invention as compared to those of the prior art, the structural integrity of the airfoil is not significantly impacted.

Although the invention has been shown and described with respect to a preferred embodiment thereof it should be understood by those skilled in the art that other various changes and omissions in the form and detail of the invention may be made without departing from the spirit and scope thereof.

We claim:

1. A cooled wall comprising
   an outer surface exposed to a hot gas stream flowing in a first direction over said outer surface;
   an inner surface defining an internal cavity containing a coolant fluid; and
   a plurality of coolant passages extending between said inner surface and said outer surface through which said coolant fluid flows from said inner surface to said outer surface, each passage having a passage outlet connected to said outer surface and over which the hot gas stream flows in said downstream direction, each passage including
   a metering section connected to said inner surface, said metering section adapted to receive a flow of coolant from the coolant compartment and to control the rate of flow of coolant fluid through said passage, and
   a diffusing section connected to said passage outlet and having a longitudinal axis extending therethrough, a diffusing section inlet opposite said passage outlet and connected to the metering section, a first side surface spaced apart from and facing a second side surface, a third surface spaced apart from and facing a fourth surface, each of said side surfaces connected to and extending between said third and fourth surfaces, said fourth surface is downstream of said first, second, and third surfaces and said fourth surface is curved and curls away from said axis in the direction of said passage outlet, and said first, second, third and fourth surfaces are connected to, and extend between, said diffusing section inlet and said passage outlet;
   wherein immediately adjacent the metering section the fourth surface diverges from the axis at an angle $\delta_1$ of at least five degrees.

2. The cooled wall according to claim 1 wherein the fourth surface intersects the metering section at a first edge, the fourth surface intersects the outer surface at a second edge, and said first and second edges define a plane that diverges from the axis at a predetermined angle $\delta_2$.

3. The cooled wall according to claim 2 wherein the fourth wall defines a section of a circular cylinder.

4. The cooled wall according to claim 3 wherein the axis intersects the outer surface at an angle $\alpha_1$ of not more than 40 degrees, and the fourth wall intersects the outer wall at an angle $\alpha_2$, where $\alpha_2 = \alpha_1 + \delta_1 - 2*\delta_2$.

5. The cooled wall according to claim 4 wherein the difference between the angle $\delta_2$ and angle $\delta_1$ is at least five degrees.

6. The cooled wall according to claim 5 wherein said axis is substantially parallel to said third surface, and said fourth surface diverges from said third surface at an angle of up to about 10 degrees immediately adjacent said first edge.

7. The cooled wall according to claim 1 wherein said wall is the external wall of a hollow airfoil.

8. The cooled wall according to claim 7 wherein the fourth surface intersects the metering section at a first edge, the fourth surface intersects the outer surface at a second edge, and said first and second edges define a plane that diverges from the axis at a predetermined angle $\delta_2$.

9. The cooled wall according to claim 8 wherein the fourth wall defines a section of a circular cylinder.

10. The cooled wall according to claim 9 wherein the axis intersects the outer surface at an angle $\alpha_1$ of not more than 40 degrees, and the fourth wall intersects the outer wall at an angle $\alpha_2$, where $\alpha_2 = \alpha_1 + \delta_1 - 2*\delta_2$.

11. The cooled wall according to claim 10 wherein the difference between the angle $\delta_2$ and angle $\delta_1$ is at least five degrees.

12. The cooled wall according to claim 11 wherein said axis is substantially parallel to said third surface, and said fourth surface diverges from said third surface at an angle of up to about 10 degrees immediately adjacent said first edge.

* * * * *